US009549437B2

(12) United States Patent
Christiansen et al.

(10) Patent No.: US 9,549,437 B2
(45) Date of Patent: Jan. 17, 2017

(54) METHOD AND A CONTROL UNIT FOR CONTROLLING A COOKING PROCESS ON AN INDUCTION COOKING HOB

(71) Applicant: Electrolux Home Products Corporation N. V., Brussels (BE)

(72) Inventors: Svend Erik Christiansen, Forli (IT); Laurent Jeanneteau, Forli (IT); Massimo Nostro, Forli (IT); Filippo Martini, Forli (IT); Alex Viroli, Forli (IT)

(73) Assignee: ELECTROLUX HOME PRODUCTS CORPORATION N.V., Brussels (BE)

( * ) Notice: Subject to any disclaimer, the term of this patent is extended or adjusted under 35 U.S.C. 154(b) by 0 days.

(21) Appl. No.: 14/439,847

(22) PCT Filed: Nov. 14, 2013

(86) PCT No.: PCT/EP2013/073818

§ 371 (c)(1),
(2) Date: Apr. 30, 2015

(87) PCT Pub. No.: WO2014/086565

PCT Pub. Date: Jun. 12, 2014

(65) Prior Publication Data

US 2015/0282255 A1 Oct. 1, 2015

(30) Foreign Application Priority Data

Dec. 4, 2012 (EP) .................................... 12195445

(51) Int. Cl.
*H05B 6/06* (2006.01)
*H05B 6/08* (2006.01)
(Continued)

(52) U.S. Cl.
CPC ............... *H05B 6/062* (2013.01); *A47J 27/62* (2013.01); *H05B 2213/07* (2013.01)

(58) Field of Classification Search
CPC ....... H05B 6/062; H05B 2213/07; A47J 27/62
(Continued)

(56) References Cited

U.S. PATENT DOCUMENTS 4,465,228 A 8/1984 Mori et al.
5,648,008 A * 7/1997 Barritt .................... H05B 6/062 219/626

(Continued)

FOREIGN PATENT DOCUMENTS

CN 101444138 A 5/2009
CN 102375415 A 3/2012

(Continued)

OTHER PUBLICATIONS

International Search Report for PCT/EP2013/073818, dated Mar. 27, 2014, 2 pages.
Office action (translation) issued in corresponding Chinese Patent Application No. 201380062803.3 dated May 4, 2016, 7 pages.

*Primary Examiner* — Quang Van
(74) *Attorney, Agent, or Firm* — Pearne & Gordon LLP

(57) ABSTRACT

A method for controlling a cooking process on an induction cooking hob (10). The method includes setting a temperature value or parameter value corresponding with the temperature by a user. A control unit of the induction cooking hob (10) sets a maximum power (Pmax) for a corresponding cooking zone, calculates an average slope value (S1, S2, ASP) of a temperature-time-diagram (20, 22, 24) of the cooking process, compares the average slope value (S1, S2, ASP) with a corresponding threshold value (THR1, THR2, THR3), and indicates that the temperature or parameter has obtained the set temperature value or parameter value, respectively, if the average slope value (S1, S2, ASP) is equal with or smaller than the corresponding threshold value (THR1, THR2, THR3). The method and control unit are provided for controlling a boiling process and a frying process on an induction cooking hob.

11 Claims, 3 Drawing Sheets

Figure 1:
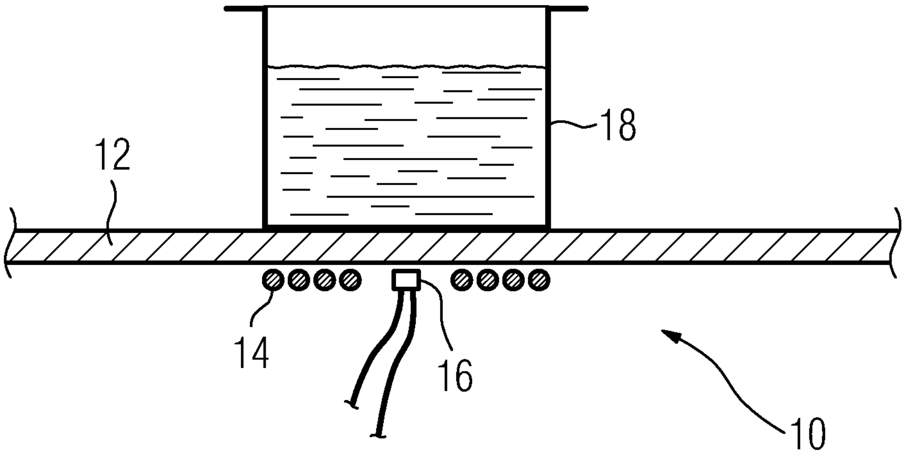

(51) Int. Cl.
*H05B 1/02* (2006.01)
*A47J 27/62* (2006.01)

(58) Field of Classification Search
USPC ....... 219/627, 628, 626, 624, 661, 665, 667, 219/491, 492, 452.11, 497, 449.1, 620
See application file for complete search history.

(56) References Cited

U.S. PATENT DOCUMENTS

| | | | | |
|---|---|---|---|---|
| 6,384,384 | B1 | 5/2002 | Connolly et al. | |
| 2005/0247696 | A1* | 11/2005 | Clothier ................. | H05B 3/746 219/497 |
| 2010/0006563 | A1* | 1/2010 | Schilling ................ | H05B 6/062 219/661 |

FOREIGN PATENT DOCUMENTS

| | | | |
|---|---|---|---|
| CN | 102378425 | A | 3/2012 |
| CN | 202397242 | U | 8/2012 |
| DE | 4336752 | A1 | 5/1995 |
| EP | 0074108 | B1 | 4/1985 |
| EP | 1489479 | A1 | 12/2004 |
| EP | 1492385 | A2 | 12/2004 |
| EP | 1492385 | B1 | 7/2009 |
| JP | 2004223048 | A | 8/2004 |
| JP | 2010160899 | A | 7/2010 |

* cited by examiner

METHOD AND A CONTROL UNIT FOR CONTROLLING A COOKING PROCESS ON AN INDUCTION COOKING HOB

The present invention relates to a method for controlling a cooking process on an induction cooking hob according to the preamble of claim 1. Further, the present invention relates to a control unit for controlling a cooking process on an induction cooking hob according to the preamble of claim 6. In particular, the present invention relates to a method and a control unit for controlling a boiling process and a frying process on an induction cooking hob. Moreover, the present invention relates to a corresponding induction cooking hob.

The user of an induction cooking hob has usually to perform different steps during the cooking process. When the user cooks beef or fries vegetables, for example, then periodic adjustments of the power are necessary in order to obtain and maintain the required temperature in the pan. The numerous adjustments of the power are particularly necessary for an induction cooking hob. The power transfer from the induction cooking hob to the pan is very good, so that the pan quickly reaches the set temperature. Further, the process of cooking pasta or boiled vegetables requires the periodic adjustments of the power in order to soften the intensity of boiling. The periodic adjustments of the power avoid a boiling over of the foodstuff and needless energy consumption after the boiling point has been reached.

During the frying process several temperature settings are required. However, the periodic adjustments of the boiling intensity or frying temperature require the permanent presence of the user in front of the induction cooking hob during the whole cooking process.

US 2005/0247696 A1 discloses a cooking device for detecting boiling of liquids in a cooking vessel. Successive temperatures of the cooking vessel are detected. A slope of the curve for the development of the successive temperatures is periodically calculated. The slope is used to recognize boiling of the liquid. Further, the indication of energy delivered to the vessel is considered for detecting the boiling. Moreover, the second derivative of the curve for the development of the successive temperatures is also periodically calculated. A processor sends a signal to the cooking device, which adjusts the power level of the cooking device to maintain a soft boil.

DE 43 36 752 A1 discloses a method for controlling the electric heating power in a cooking device. The position and size of a cooking pot are determined by capacitive measurements at the lower side of the cooking panel. The temperature at the lower side of the cooking panel is detected by further electrodes. The development of an average temperature of the panel below the cooking pot is detected. The first derivative of the development of said average temperature is determined. If the first derivative goes below a predetermined threshold value, then the boiling point is recognized.

U.S. Pat. No. 4,465,228 discloses a cooking apparatus with a heating control system. The cooking apparatus is suitable for stew cooking or the like liable to boiling over. The temperature at an outer bottom side of a pan is detected. The temperature gradients are sampling-measured at a sampling time pitch. The boiling of food stuff is recognized by a decrease of the temperature gradient. When the boiling of food stuff occurs, then the power supplied to the pan is reduced in order to avoid boiling over, until the temperature gradients become suitable values.

EP 1 492 385 A2 discloses a method and apparatus for recognizing heating processes. During the heating process the development of the temperature on the cooking hob is detected. The temperature gradient is determined. A regular cooking process corresponds with a temperature gradient bigger than a predetermined threshold value, while a faulty cooking process is recognized by a temperature gradient smaller than said predetermined threshold value.

JP 2010-160899 A discloses an induction heating cooker. An infrared sensor detects infrared rays emitted from a cooking container. A temperature sensor at a lower face of top plate detects the temperature of the cooking container. A control unit adjusts the power supplied to the heating coil at a small quantity mode, when a temperature slope detected by the infrared sensor is bigger than a predetermined temperature slope. In contrast, the control unit adjusts the power supplied to the heating coil at a normal-quantity mode, when the temperature slope detected by the infrared sensor is smaller than the predetermined temperature slope.

It is an object of the present invention to provide a method and a control unit for controlling an induction cooking hob by low complexity, which allows that the permanent presence of the user in front of the cooking hob is not required.

The object of the present invention is achieved by the method according to claim 1.

According to the present invention at least two sliding windows are defined in the temperature-time-diagram, wherein the sliding windows extend over different time intervals and/or include different numbers of samples for detecting the temperature, and wherein a first average slope value is calculated within a first sliding window and a second average slope value is calculated within a second sliding window.

The present invention allows that the presence of the user is not required. After the at least one average slope value is equal with or smaller than the corresponding threshold value, then the temperature or parameter has obtained the set temperature value or parameter value, respectively. This is indicated to the user, preferably by an acoustic and/or optical signal.

In particular, the set temperature value or parameter value is adjustable by the user. This allows an adaption to the different behaviour of several pots and/or pans. Some pots or pans can reach a higher temperature than other pots or pans with the same set temperature or parameter values.

Further, the adjusted temperature value or parameter value is storable in a memory of the control unit. The stored adjusted temperature values or parameter values may be recalled in subsequent cooking processes.

According to one embodiment of the present invention the cooking process is a boiling process, wherein the set parameter value is the boiling intensity.

According to another embodiment of the present invention the cooking process is a frying process, wherein the set temperature value is a temperature of a pan on the cooking zone.

The object of the present invention is further achieved by the control unit according to claim 1.

According to the present invention the calculator defines at least two sliding windows in the temperature-time-diagram, wherein the sliding windows extend over different time intervals and/or include different numbers of samples for detecting the temperature, and wherein the calculator is provided for calculating a first average slope value within a first sliding window and a second average slope value within a second sliding window.

In particular, the user interface is provided for adjusting the temperature value or parameter value. This allows an adaption to the different behaviour of several pots and/or pans by the user. Some pots or pans reach a higher temperature than other pots or pans with the same set temperature or parameter values.

Further, the control unit comprises a memory for storing the adjusted temperature value or parameter value. The stored adjusted temperature values or parameter values can be recalled in subsequent cooking processes.

According to the one embodiment of the present invention the control unit is provided for controlling a boiling process, wherein the set parameter value is the boiling intensity.

According to the other embodiment of the present invention the control unit is provided for controlling a frying process, wherein the set temperature value is a temperature of a pan on the cooking zone.

At last, the present relates to an induction cooking hob provided for the method mentioned above and/or comprising a control unit as described above.

Novel and inventive features of the present invention are set forth in the appended claims.

Figure 2:
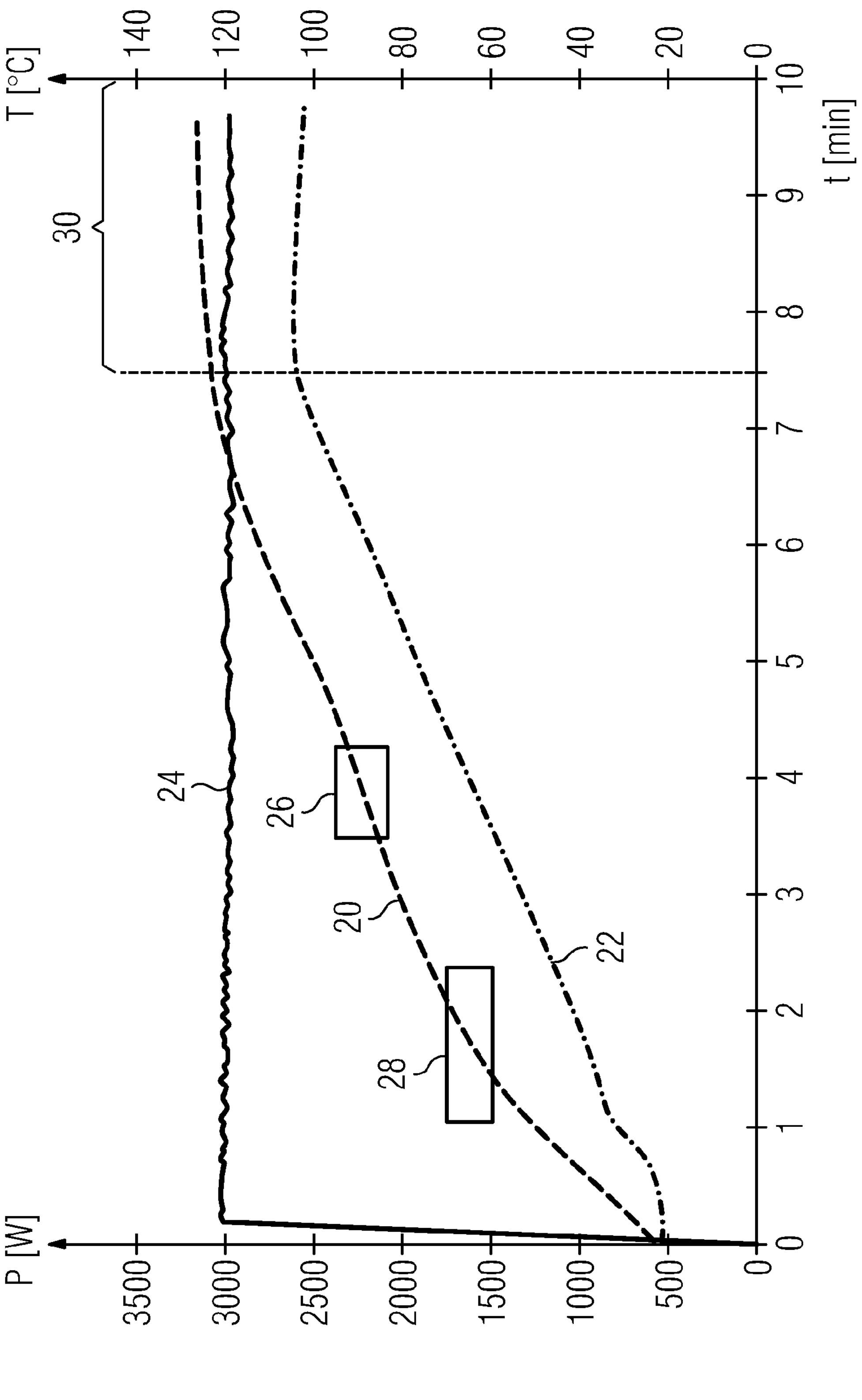
Figure 3:
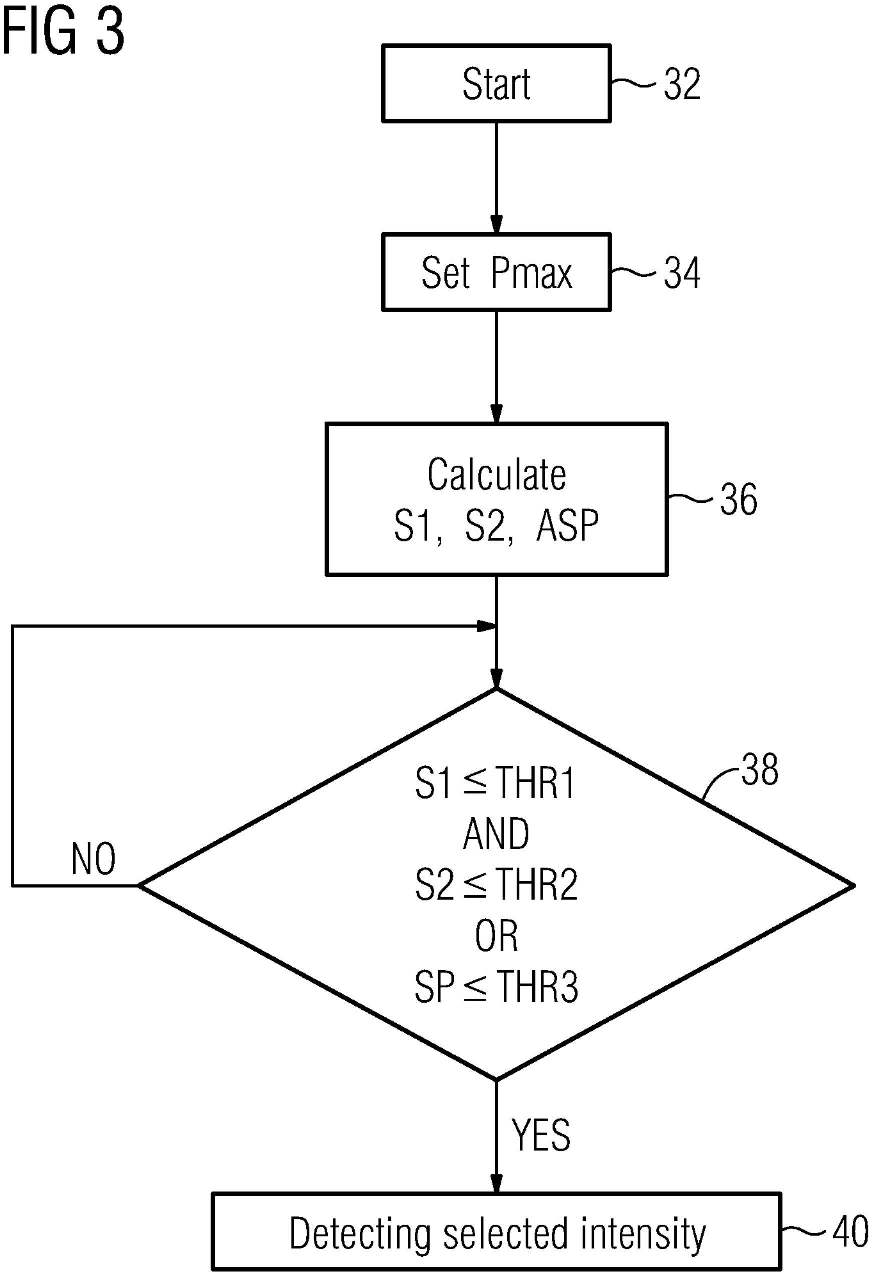

The present invention will be described in further detail with reference to the drawings, in which FIG. 1 illustrates a schematic side view of a cooking zone of an induction cooking hob provided for the method and control unit according to a preferred embodiment of the present invention, FIG. 2 illustrates a schematic view of three temperature-time diagrams for the method and control unit according to the preferred embodiment of the present invention, and FIG. 3 illustrates a schematic flow chart diagram of an algorithm for the method and control unit according to the preferred embodiment of the present invention.

FIG. 1 illustrates a schematic side view of a cooking zone of an induction cooking hob 10 provided for the method and control unit according to the present invention. The induction cooking hob 10 comprises a top panel 12. Preferably, the top panel 12 is a glass ceramic panel.

The cooking zone of the induction cooking hob 10 includes an induction coil 14 and a temperature sensor 16. The induction coil 14 is arranged below the top panel 12. The temperature sensor 16 is arranged in the centre of the induction coil 14. A pan 18 or pot 18 is arranged on the top panel 12 of the induction cooking hob 10. The pan 18 or pot 18 is arranged above the induction coil 14 and the temperature sensor 16.

Further, the induction cooking hob 10 includes the control unit for controlling the power transferred to the pan 18 or pot 18 and/or the temperature of said pan 18 or pot 18. The control unit is not explicitly shown.

The induction cooking hob 10 is provided for the method and the control unit for controlling a cooking process according to the present invention. In particular, the method and the control unit are provided for controlling a boiling process and frying process.

In the beginning of the boiling process the user may select a threshold value of the boiling intensity. The boiling intensity is controlled by using the detected values of the temperature sensor 16. When the selected boiling intensity has been reached, then the user is warned by an acoustic and/or optical signal. The user may perform a fine tuning around the selected boiling intensity.

In the beginning of the frying process the user may select one of several threshold values of the frying temperature. Said threshold value depends on the category of the foodstuff and/or the personal cooking style. The frying temperature is controlled by using the detected values of the temperature sensor 16. When the selected frying temperature has been reached, then the user is warned by an acoustic and/or optical signal. The user may perform a fine tuning around the selected frying temperature.

FIG. 2 illustrates a schematic view of three temperature-time diagrams 20, 22 and 24 for the method and control unit according to the preferred embodiment of the present invention. The diagrams in FIG. 2 relate to the boiling process, wherein the three temperature-time diagrams 20, 22 and 24 correspond with a selected boiling intensity in each case. The corresponding values of the power transferred to the pot 18 or pan 18 on the top panel 12 are also shown. In a time interval 30 the boiling occurs.

The temperature T is periodically detected after equal intervals. In this example, the time of each interval is four seconds. A slope of the temperature-time diagrams 20, 22 and 24 is determined by a number of subsequent temperature detections, i.e. samples, within a predetermined window size. Two different window sizes are defined. In this example, a small sliding window 26 comprises twelve subsequent samples, and a big sliding window 28 comprises twenty subsequent samples. In general, the big sliding window 28 comprises more subsequent samples than the small sliding window 26.

A first-degree temperature slope TS is given by:

$$TS(t2-t1)=T(t2)-T(t1). \quad (1)$$

For example, the time difference t2-t1 may be twelve seconds.

A first average slope value S1 is calculated within the big sliding window 28 on the basis of several values for the first-degree temperature slope TS. Thus, the first average slope value S1 is the average of the detected first-degree temperature slopes TS within the big sliding window 28. In a similar way, a second average slope value S2 is calculated within the small sliding window 26 on the basis of several values for the first-degree temperature slope TS. Thus, the second average slope value S2 is the average of the detected first-degree temperature slopes TS within the small sliding window 26. The first average slope value S1 and the second average slope value S2 are average values of the same first-degree temperature slopes TS, wherein the first average slope value S1 and the second average slope value S2 are estimated within different big sliding window 26 and 28.

A first threshold value THR1 is defined for the first average slope value S1. Accordingly, a second threshold value THR2 is defined for the second average slope value S2. The first threshold value THR1 and the second threshold value THR2 are defined by the results of experiments, wherein different types of pots 18 with or without lid and a quantity of water have been taken into account.

Starting from formula (1) for the first-degree temperature slope TS between two points in time, at a generic point in time to a percentage slope value SP can be calculated:

$$SP(tn)=\{[TS(tn-(tn-60s))-TS((tn-90s)-((tn-90s)-60s))]/TS((tn-90s)-((tn-90s)-60s))\}*100.$$

The difference of the first-degree temperature slope TS is a second-degree temperature slope TSS:

$$TSS(tn)=TS(tn-(tn-60s))-TS((tn-90s)-((tn-90s)-60s)) \quad (2)$$

For example, the second temperature slope TSS is calculated every 90 seconds on the first temperature slope TS(60s).

Thus, the percentage slope value SP is calculated by:

$$SP(tn)=\{TSS(tn)/TS((tn-90s)-((tn-90s)-60s))\}*100. \quad (3)$$

The above algorithm is only an example. Alternatively, equivalent or similar formulas may be also suitable.

The percentage slope value SP allows a quick detection of the parameters. When the temperature-time diagrams 20, 22 or 24 starts bending above a threshold value, then the water in the pot 18 is boiling with the boiling intensity according to the selected threshold value.

An average percentage slope value ASP is calculated on the basis of several percentage slope values SP, for example on the basis of three percentage slope values SP.

A third threshold value THR3 is defined for the average percentage slope value ASP. The third threshold value THR3 is also defined by the results of experiments, wherein different types of pots 18 with or without lid and a quantity of water have been taken into account.

FIG. 3 illustrates a schematic flow chart diagram of an algorithm for the method and control unit according to the preferred embodiment of the present invention. The flow chart diagram relates to the boiling process. However, the flow chart diagram is also applicable to the frying process.

In a first step 32 the cooking process is started by the user. The user can set one of several predetermined values of the boiling intensity for the boiling process. If the frying process is performed, then the user can set one of several predetermined values of the temperature in the pan 18. As next step 34 the maximum power Pmax of the corresponding cooking zone is automatically set by the control unit.

In a further step 36, the first average slope value S1, the second average slope value S2 and the average percentage slope value ASP are calculated. The first average slope value S1 is calculated within the big sliding window 28 on the basis of several values for the first-degree temperature slope TS. In the same way, the second average slope value S2 is calculated within the small sliding window 26 on the basis of several values for the first first-degree temperature slope temperature slopes TS. The first-degree temperature slope TS has been calculated according to equation (1) before. The average percentage slope value ASP is calculated on the basis of several percentage slope values SP. For example, the average percentage slope value ASP is calculated on the basis of three percentage slope values SP, wherein the percentage slope values SP has been calculated according to equations (2) and (3) before.

During a following step 38 the first average slope value S1, the second average slope value S2 and the average percentage slope value ASP are compared with the corresponding threshold values THR1, THR2 and THR3, respectively. If the first average slope value S1 and the second average slope value S2 or the average percentage slope value ASP are smaller than or equal with the corresponding threshold values THR1, THR2 and THR3, then a last step 40 is activated. In the last step 40 the set boiling intensity is detected, and an acoustic and/or optical signal is sent to the user by the control unit. If the cooking process is a frying process, then the set frying temperature is detected.

The control of a frying process may be performed in a similar way as the boiling process mentioned above. The threshold values depend on the foodstuff categories and/or the personal cooking styles. The temperature in the pan 18 is set by the user. When said temperature has been reached, then the acoustic and/or optical signal is sent to the user by the control unit.

During the whole cooking process, the user can make an adjustment to the set boiling intensity or frying temperature, respectively. Said adjustment allows that the behaviour of different pots 18 or pans 18 can be taken into account. By the same set values the pot 18 or pan 18 may reach a higher temperature than another pot or pan, respectively. Further, the adjustment can be memorized, so that the user can recall the same set value next times.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 induction cooking hob
12 top panel
14 induction coil
16 temperature sensor
18 pot, pan
20 first temperature-time diagram
22 second temperature-time diagram
24 third temperature-time diagram
26 small sliding window
28 big sliding window
30 time interval of boiling
32 step of starting the cooking process
34 step of setting the maximum power Pmax
36 step of calculating the average slope values
38 step of comparing the average slope values
40 step of detecting the set boiling intensity
t time
tn generic point in time
T temperature
P power
Pmax maximum power
TS first-degree temperature slope
TSS second-degree temperature slope
S1 first average slope value
S2 second average slope value
SP percentage slope value
ASP average percentage slope value
THR1 first threshold value
THR2 first threshold value
THR3 third threshold value

The invention claimed is:

1. A method for controlling a cooking process on an induction cooking hob (10), wherein said method comprises the following steps:

setting at least one temperature value for the temperature (T) of a pot (18) or pan (18) on a cooking zone or at least one parameter value corresponding with the temperature (T) of the pot (18) or pan (18) on the cooking zone by a user, starting the cooking process by a control unit of the induction cooking hob (10), setting a maximum power (Pmax) for a corresponding cooking zone by the control unit, calculating at least one average slope value (S1, S2) or average percentage slope value (ASP) of a temperature-time-diagram (20, 22, 24) of the cooking process by the control unit, comparing the at least one average slope value (S1, S2) or average percentage slope value (ASP) with a corresponding threshold value (THR1, THR2, THR3) defined for the average slope value (S1, S2) or average percentage slope value (ASP), respectively, by the control unit, and indicating that the temperature or parameter has obtained the set temperature value or parameter value, respectively, by the control unit, if the average slope value (S1, S2) or average percentage slope value (ASP) is equal with or smaller than the corresponding threshold value (THR1, THR2, THR3), characterized in that at least two sliding windows (26, 28) are defined in the temperature-time-diagram (20, 22, 24), wherein the sliding windows (26, 28) extend over different time intervals and/or include different numbers of samples for detecting the temperature (T), and wherein a first average slope value (S1) is calculated within a first sliding window (28) and a second average slope value (S2) is calculated within a second sliding window (26).

2. The method according to claim 1, characterized by the set temperature value or parameter value is adjustable by the user.

3. The method according to claim 2, characterized in that the adjusted temperature value or parameter value is storable in a memory of the control unit.

4. The method according to claim 1, characterized in that the cooking process is a boiling process, wherein the set parameter value is the boiling intensity.

5. The method according to claim 1, characterized in that the cooking process is a frying process, wherein the set temperature value is the temperature of the pot (18) or pan (18) on the cooking zone.

6. A control unit for controlling a cooking process on an induction cooking hob (10), wherein:

the control unit comprises a user interface for setting at least one temperature value for the temperature (T) of a pot (18) or pan (18) on a cooking zone or at least one parameter value corresponding with the temperature (T) of the pot (18) or pan (18) on the cooking zone, the control unit starts the cooking process by setting a maximum power (Pmax) for the corresponding cooking zone, the control unit comprises a calculator for calculating at least one average slope value (S1, S2) or average percentage slope value (ASP) of a temperature-time-diagram (20, 22, 24) of the cooking process, the control unit comprises a comparator for comparing the at least one average slope value (S1, S2) or average percentage slope value (ASP) with a corresponding threshold value (THR1, THR2, THR3) defined for the average slope value (S1, S2) or average percentage slope value (ASP), respectively, and the user interface is provided for indicating that the temperature or parameter corresponding with the temperature has obtained the set temperature value or parameter value, respectively, if the average slope value (S1, S2) or average percentage slope value (ASP) is equal with or smaller than the corresponding threshold value (THR1, THR2, THR3), characterized in that the calculator defines at least two sliding windows (26, 28) in the temperature-time-diagram (20, 22, 24), wherein the sliding windows (26, 28) extend over different time intervals and/or include different numbers of samples for detecting the temperature (T), and wherein the calculator is provided for calculating a first average slope value (S1) within a first sliding window (28) and a second average slope value (S2) within a second sliding window (26).

7. The control unit according to claim 6, characterized by the user interface is provided for adjusting the temperature value or parameter value.

8. The control unit according to claim 6, characterized in that the control unit comprises a memory for storing the adjusted temperature value or parameter value.

9. The control unit according to claim 6, characterized in that the control unit is provided for controlling a boiling process, wherein the set parameter value is the boiling intensity.

10. The control unit according to claim 6, characterized in that the control unit is provided for controlling a frying process, wherein the set temperature value is the temperature of the pot (18) or pan (18) on the cooking zone.

11. An induction cooking hob (10), comprising a control unit according to claim 6.

* * * * *